United States Patent
Lee et al.

(10) Patent No.: US 11,051,080 B2
(45) Date of Patent: Jun. 29, 2021

(54) METHOD FOR IMPROVING VIDEO RESOLUTION AND VIDEO QUALITY, ENCODER, AND DECODER

(71) Applicant: Marvel Digital Limited, Hong Kong (CN)

(72) Inventors: Herbert Ying Chiu Lee, Hong Kong (CN); King To Ng, Hong Kong (CN)

(73) Assignee: Marvel Digital Limited, Shatin (HK)

( * ) Notice: Subject to any disclaimer, the term of this patent is extended or adjusted under 35 U.S.C. 154(b) by 277 days.

(21) Appl. No.: 16/089,062

(22) PCT Filed: Mar. 29, 2017

(86) PCT No.: PCT/CN2017/078556
§ 371 (c)(1),
(2) Date: Sep. 27, 2018

(87) PCT Pub. No.: WO2017/167194
PCT Pub. Date: Oct. 5, 2017

(65) Prior Publication Data
US 2019/0132649 A1 May 2, 2019

(30) Foreign Application Priority Data
Mar. 29, 2016 (HK) .................................. 16103565.1

(51) Int. Cl.
*H04N 21/6547* (2011.01)
*H04N 21/236* (2011.01)
(Continued)

(52) U.S. Cl.
CPC .......... *H04N 21/6547* (2013.01); *H04N 7/22* (2013.01); *H04N 19/46* (2014.11);
(Continued)

(58) Field of Classification Search
None
See application file for complete search history.

(56) References Cited

U.S. PATENT DOCUMENTS 5,987,181 A * 11/1999 Makiyama ......... H04N 21/2662
358/426.12
6,310,981 B1 * 10/2001 Makiyama ......... H04N 21/2662
375/E7.012

(Continued)

FOREIGN PATENT DOCUMENTS

| CN | 102404560 A | 4/2012 |
|---|---|---|
| CN | 102611690 A | 7/2012 |
| CN | 104581199 A | 4/2015 |

OTHER PUBLICATIONS

International Search Report and Written Opinion issued in connection with the corresponding International Application No. PCT/CN2017/078556 dated Jun. 30, 2017.

*Primary Examiner* — Junior O Mendoza
(74) *Attorney, Agent, or Firm* — The H.T. Than Law Group

(57) ABSTRACT

More particularly, the present invention relates to a method for improving video resolution and video quality, a video encoder, and a decoder for a display terminal. In order to solve the problem that the existing automatic calculation technology cannot perform targeted processing on the video data, the processed video cannot achieve the expected effect and affect the user experience. The present invention provides a method for improving video resolution and quality, including: calculating and determining video processing algorithm information and parameter information corresponding to video processing algorithm information; encoding video data, the video processing algorithm information, and parameters corresponding to the video processing algo- (Continued)

rithm information; transmitting the encoded video data, the video processing algorithm information, and the parameter information corresponding to the video processing algorithm to the decoder of the display terminal. The parameter information corresponding to the video processing algorithm information is video auxiliary data, including a video filter type parameter and/or a filter window size parameter, and/or a depth map video data of an object and/or a scene for dividing a video, for processing video processes. The method for improving video quality provided by the present invention determines and encodes video processing algorithm information and parameter information corresponding to the video processing algorithm by the video encoder, and the decoder of the display terminal calls the corresponding video processing algorithm to process the video data according to the video processing algorithm information and do targeted processing of video data. By analyzing the characteristics of the video data and determining the parameter information corresponding to the video processing algorithm, the video processing can be more targeted, so that the processed video quality is better and the user experience is improved.

18 Claims, 9 Drawing Sheets

(51) Int. Cl.
*H04N 21/434* (2011.01)
*H04N 7/22* (2006.01)
*H04N 21/81* (2011.01)
*H04N 21/258* (2011.01)
*H04N 21/658* (2011.01)
*H04N 19/46* (2014.01)
*H04N 21/426* (2011.01)
*H04N 21/4402* (2011.01)

(52) U.S. Cl.
CPC . *H04N 21/23614* (2013.01); *H04N 21/25808* (2013.01); *H04N 21/426* (2013.01); *H04N 21/4348* (2013.01); *H04N 21/440263* (2013.01); *H04N 21/6582* (2013.01); *H04N 21/8193* (2013.01)

(56) References Cited

U.S. PATENT DOCUMENTS

| | | |
|---|---|---|
| 9,729,899 B2 | 8/2017 | Tourapis et al. |
| 2007/0274385 A1 | 11/2007 | He |
| 2016/0037175 A1* | 2/2016 | Deshpande ............ H04N 19/31 375/240.01 |
| 2016/0156915 A1* | 6/2016 | Choi .................... H04N 19/187 375/240.08 |
| 2016/0165246 A1 | 6/2016 | Nagumo et al. |
| 2017/0347125 A1* | 11/2017 | Tourapis .............. H04N 19/587 |
| 2018/0007400 A1* | 1/2018 | Chen .................. H04N 21/2343 |

* cited by examiner

METHOD FOR IMPROVING VIDEO RESOLUTION AND VIDEO QUALITY, ENCODER, AND DECODER

CROSS-REFERENCE TO RELATED APPLICATIONS

This application claims priority and the benefit of Hong Kong Patent Application No. 16103565.1, filed on 29 Mar. 2016, which is incorporated by reference herein in its entirety. All references and products cited within this application and the contents thereof are incorporated by reference herein in their entirety.

TECHNICAL FIELD

The invention belongs to the field of image and video processing, and particularly relates to a method for improving video resolution and video quality, a video encoder and a decoder for a display terminal.

BACKGROUND

With the development of technology, people have higher and higher requirements for video display quality. How to quickly obtain high-quality video data from existing video sources (such as optical disc, Blu-ray and broadcast) has been widely studied. However, some of the prior art conversion techniques cannot be widely used due to their computational complexity, unsatisfactory computational quality, or discomfort for limited broadband transmission channels. In the prior art, the method for improving the resolution and quality of the video is that the server transmits the video data to the decoder, and the video data is automatically processed by the decoder, but the method is not targeted when the video algorithm is automatically calculated, and the video is different. The same processing method will reduce the video processing effect and affect the user experience.

SUMMARY

The invention provides a method, an encoder and a decoder for improving video resolution and quality, which are used for solving the problem that the existing automatic calculation technology cannot perform targeted processing on the video data, so that the processed video cannot reach the expected result, so as to affect the user experiences.

In order to solve the above technical problem, the present invention provides a method for improving video resolution and quality, including: calculating and determining video processing algorithm information and parameter information corresponding to video processing algorithm information; encoding video data, said video processing algorithm information, and the parameter information corresponding to the video processing algorithm; sending the encoded video data, the video processing algorithm information, and the parameter information corresponding to the video processing algorithm to the decoder of the display terminal. Said parameter information corresponding to the video processing algorithm information is video auxiliary data, including a video filter type parameter and/or a filter window size parameter, and/or a depth map video data of an object and/or a scene for dividing a video, for processing video processes.

The present invention provides a method for improving video resolution and quality, comprising: receiving video data, video processing algorithm information, and parameter information corresponding to video processing algorithm information sent by a video encoder; decoding the video data, the video processing algorithm information and the parameter information corresponding to the video processing algorithm information; searching for a corresponding video processing algorithm according to the video processing algorithm information, inputting parameter information corresponding to the video processing algorithm into a corresponding video processing algorithm, and starting the corresponding video processing algorithm to process the video data. The parameter information corresponding to the video processing algorithm information is video auxiliary data, including a video filter type parameter and/or a filter window size parameter, and/or a depth map video data of an object and/or a scene for dividing a video, for processing video processes.

The present invention further provides a video encoder, including: a processing information determining unit, configured to calculate video processing algorithm information and parameter information corresponding to video processing algorithm information; and a coding unit, configured to encode video data, the video processing algorithm information, and the parameter information corresponding to the video processing algorithm; the sending unit is configured to send the encoded video data, the video processing algorithm information, and the parameter information corresponding to the video processing algorithm to the decoder of the display terminal. The parameter information corresponding to the video processing algorithm information is video auxiliary data, including a video filter type parameter and/or a filter window size parameter, and/or a depth map video data of an object and/or a scene for dividing a video, for processing video processes.

The present invention further provides a decoder for a display terminal, comprising: a receiving unit, configured to receive video data, video processing algorithm information, and parameter information corresponding to video processing algorithm information sent by a video encoder; and a decoding unit, configured to decode the video data, the video processing algorithm information, and the parameter information corresponding to the video processing algorithm information; the processing unit is configured to search for a corresponding video processing algorithm according to the video processing algorithm information, and input the parameter information corresponding to the video processing algorithm into the corresponding video. Processing the algorithm, initiating the corresponding video processing algorithm to process the video data. The parameter information corresponding to the video processing algorithm information is video auxiliary data, including a video filter type parameter and/or a filter window size parameter, and/or a depth map video data of an object and/or a scene for dividing a video, for processing video processes.

The method for improving video quality provided by the present invention determines and encodes video processing algorithm information and parameter information corresponding to the video processing algorithm by the video encoder, and the decoder of the display terminal calls the corresponding video processing algorithm to process the video data according to the video processing algorithm information. Ability to do targeted processing of video data. By analyzing the characteristics of the video data and determining the parameter information corresponding to the video processing algorithm, the video processing can be more targeted, so that the processed video quality is better and the user experience is improved.

BRIEF DESCRIPTION OF THE DRAWINGS

In order to more clearly illustrate the technical solutions in the embodiments of the present invention, the drawings to be used in the embodiments will be briefly described below. It is obvious that the drawings in the following description are only some embodiments of the present invention, those skilled in the art can also obtain other drawings based on these drawings without paying any creative work.

DETAILED DESCRIPTION

In order to make the technical features and effects of the present invention more obvious, the technical solutions of the present invention will be further described below with reference to the accompanying drawings, and the present invention may be described or implemented in various other specific examples, and any person skilled in the art is in the scope of the claims. Equivalent transformations made within the scope of protection of the present invention.

The video encoder of the present invention is a video encoder from a TV station or, a video website with a video distribution right, and the display terminal is a terminal device with a display such as a mobile phone, a computer, a notebook, a platform computer, etc., each terminal device has various built-in video processing algorithms. Methods and interpretation of different video processing algorithms to videos are different.

Figure 1:
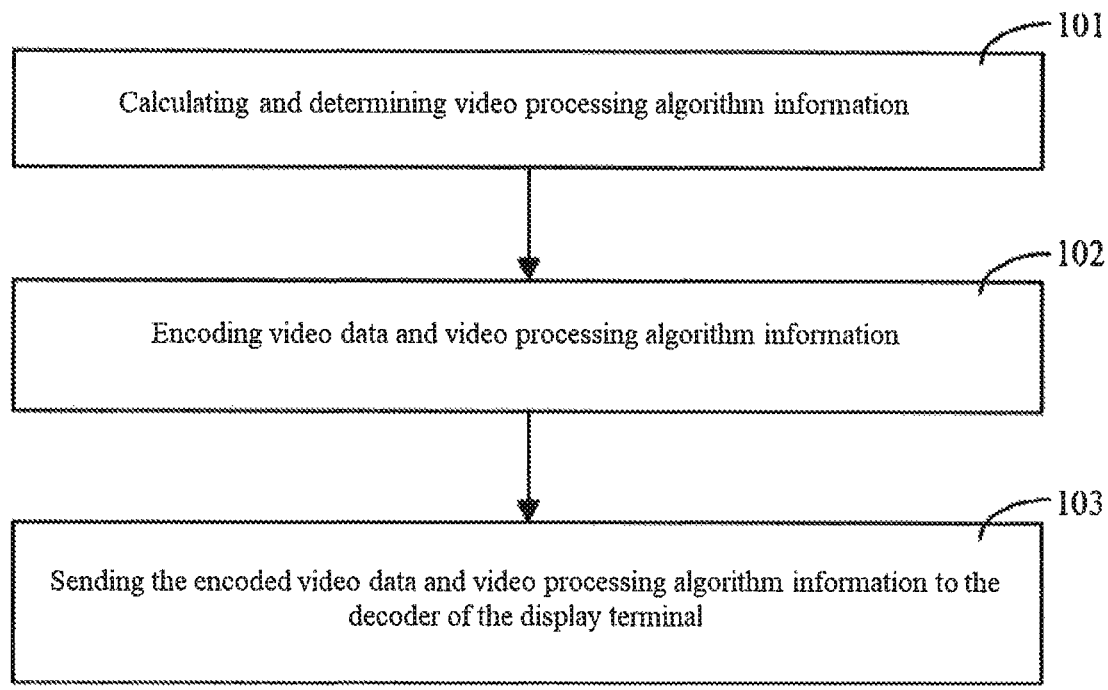
FIG. 1 illustrates a flowchart of a method for improving video quality of a display terminal according to an embodiment of the present invention.

As shown in FIG. 1, FIG. 1 is a flowchart of a method for improving video quality of a display terminal according to an embodiment of the present invention. The method includes: Step 101: Calculating and determining video processing algorithm information, where the video processing algorithm information may be the information that uniquely represents the video processing algorithm, such as the video processing algorithm number or the memory address of the video processing algorithm in the display terminal. In a specific implementation, the video processing algorithm may be determined by an artificial judgment manner. Step 102: Encoding the video data and the video processing algorithm information: the encoding may be performed by using an existing method, and the present invention does not limit the specific encoding method. Step 103: Send the encoded video data and video processing algorithm information to a decoder of the display terminal.

Figure 2:
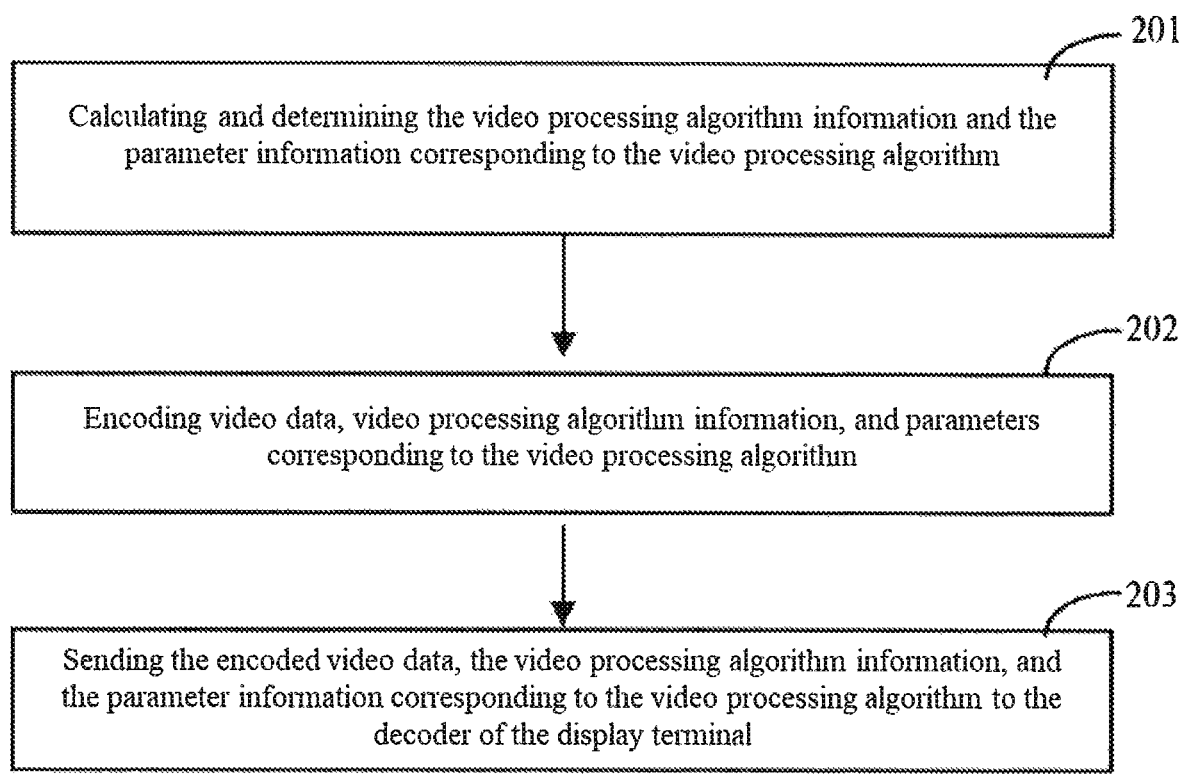
FIG. 2 illustrates flowchart of a method for improving video quality of a display terminal according to another embodiment of the present invention.

In an embodiment of the invention, the video data and the video processing algorithm information are stored in a memory. As shown in FIG. 2, FIG. 2 is a flowchart of a method for improving video quality of a display terminal according to another embodiment of the present invention. The method for improving video quality is further, in step 201, calculating and determining video processing algorithm information and the parameter information corresponding to a video processing algorithm. Wherein the parameter information includes but is not limited to a noise reduction parameter, a contrast enhancement parameter, and a color enhancement parameter.

In an embodiment of the present invention, the video processing algorithm information and the parameter information corresponding to the video processing algorithm may be manually determined and modified. In another embodiment of the present invention, the parameter information corresponding to the video processing algorithm is determined according to the characteristics of the video data. For example, according to the scenario information of the video data, different scenarios correspond to different parameter information. For example, landscape video requires high color and brightness, and parameter information should include color enhancement and contrast enhancement parameter information. Step 202: Encoding video data, video processing algorithm information, and parameter information corresponding to the video processing algorithm. Step 203: Sending the encoded video data, the video processing algorithm information, and the parameter information corresponding to the video processing algorithm to the decoder of the display terminal. In a specific implementation, the parameter information corresponding to the video processing algorithm and said video data are merged and packaged into a video data packet; and said video processing algorithm information is packaged into a video processing algorithm information packet. The video data packet and video processing algorithm information packet are transmitted to the display terminal in a way of transmitting the video stream.

In an embodiment of the invention, the video processing algorithm stored by the display terminal comprises a 2K video to 4K video conversion algorithm for implementing the 2K video to 4K video conversion.

The method for improving video quality provided by the present invention sends video data and video processing algorithm information to a decoder of a display terminal, and a decoder of the display terminal invokes a corresponding video processing algorithm to process video data according to video processing algorithm information, and can perform targeted processing to the video data. By analyzing the characteristics of the video data and determining the parameter information corresponding to the video processing algorithm, the video processing can be more targeted, so that the processed video quality is better and the user experience is improved.

Figure 3:
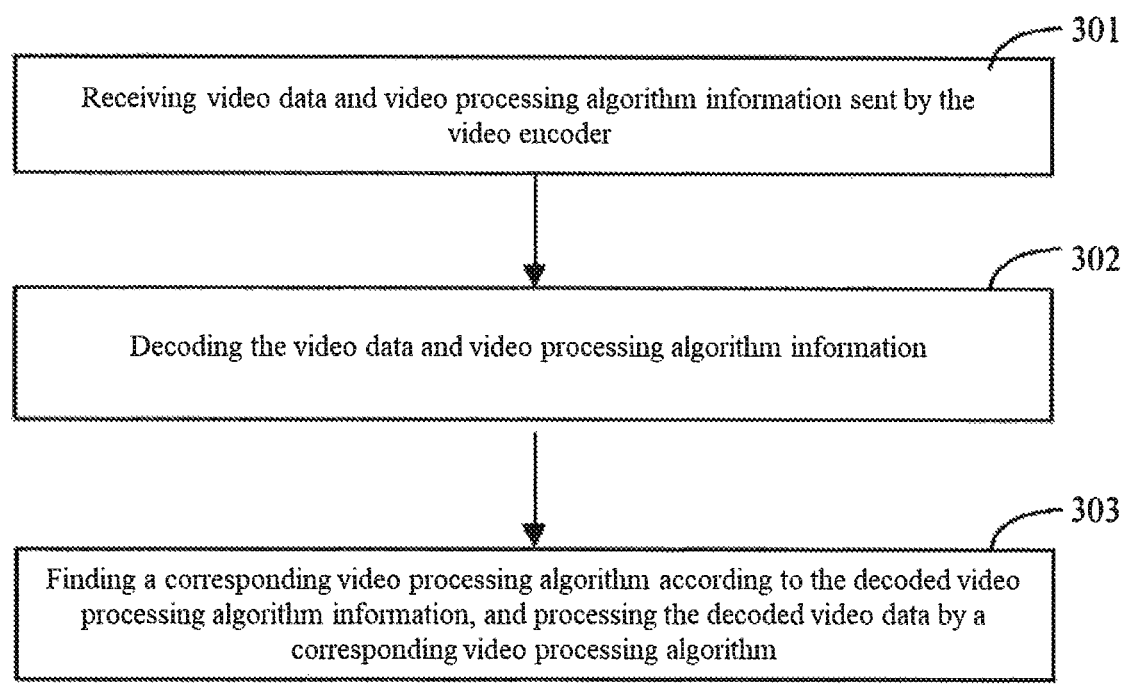
FIG. 3 illustrates a flowchart for improving video quality of display terminal according to still another embodiment of the present invention.

As shown in FIG. 3, FIG. 3 is a flowchart of a method for improving video quality of a display terminal according to a further embodiment of the present invention. The display terminal has a plurality of built in video processing algorithms. The method includes: Step 301: Receiving video data and video processing algorithm information sent by the video encoder; concretely, the video data and video processing algorithm information can also be obtained from the memory of the video encoder. Step 302: Decoding the video data and video processing algorithm information; Step 303: Searching for a corresponding video processing algorithm according to the decoded video processing algorithm information, and processing the decoded video data by a corresponding video processing algorithm.

In detail, the video processing algorithm information is information that uniquely represents a video processing algorithm, such as a storage address of a video processing algorithm in a display terminal or a number of a video processing algorithm.

When the video processing algorithm information is a storage address, step 303 is further: positioning a video processing algorithm of the storage address, and processing the video data by the located video processing algorithm: when the video processing algorithm information is numbered, the step 303 further: matching the video processing algorithm corresponding to the video processing algorithm number, and processing the video data by the matched video processing algorithm.

Figure 4:
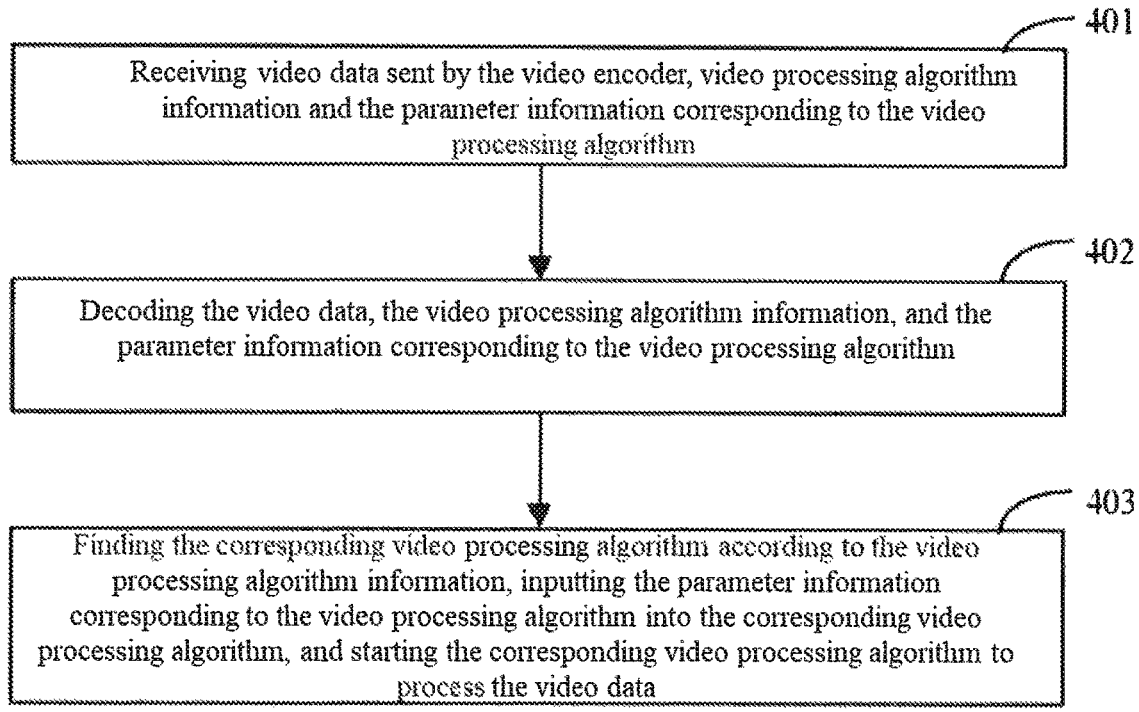
FIG. 4 illustrates a flowchart of a method for improving video quality of a display terminal according to further embodiment of the present invention.

As shown in FIG. 4, FIG. 4 is a flowchart of a method for improving video quality by a display terminal according to still another embodiment of the present invention. The method includes the following steps: Step 401: Receiving video data, video processing algorithm information, and the parameter information corresponding to the video processing algorithm; Step 402: Decoding the video data, the video processing algorithm information, and the parameter information corresponding to the video processing algorithm; Step 403: Finding a corresponding video processing algorithm according to the video processing algorithm information, and inputting the parameter information corresponding to the video processing algorithm into the corresponding video processing algorithm, and starting the corresponding video processing algorithm to process the video data. In an embodiment of the invention, the video processing algorithm stored by the display terminal comprises an algorithm converting 2K video to 4K video for implementing 2K video to 4K video conversion.

The method for improving video quality provided by the invention provides that the display terminal receives the video data and the video processing algorithm information, and calls the corresponding video processing algorithm to process the video data according to the video processing algorithm information, and can perform targeted processing on the video data. The display terminal receives the video data, the video processing algorithm information, and the parameter information corresponding to the video processing algorithm, and calls a corresponding video processing algorithm according to the video processing algorithm information, and inputs the parameter information corresponding to the video processing algorithm into the corresponding video processing algorithm to start processing the video. This method makes the video processing more targeted, so that the processed video quality is better and the user experience is improved.

Figure 5:
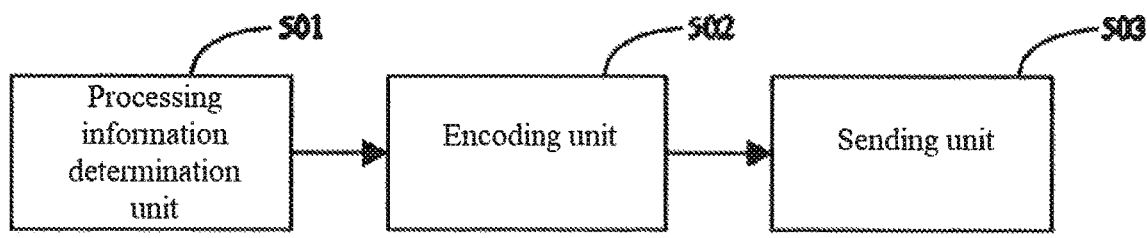
FIG. 5 illustrates a schematic diagram of a video encoder according to an embodiment of the invention.

An embodiment of the present invention provides a video encoder. As shown in FIG. 5, the video encoder includes a processing information determining unit 501, configured to calculate and determine video processing algorithm information, where the video processing algorithm information may be the number of the storage address or the video processing algorithm in the display terminal of the video processing algorithm; the encoding unit 502 is configured to encode the video data and the video processing algorithm information; and the sending unit 503 is configured to send the encoded video data and the video processing algorithm information to the decoder of the display terminal.

Further, the processing information determining unit 501 is further configured to calculate and determine parameter information corresponding to the video processing algorithm; the encoding unit 502 is further configured to encode parameter information corresponding to the video processing algorithm; and the sending unit 503 is further configured to send the video processing algorithm corresponding to the parameter information to the decoder of the display terminal. The above parameter information can be set manually. In another embodiment of the present invention, the video processing parameter information is determined according to the characteristics of the video data. For example, according to the scene information of the video data, different scenes correspond to different video processing parameter information. For example, landscape video requires high color and brightness, and video processing parameter information should include color enhancement and contrast enhancement parameter information.

Figure 6:
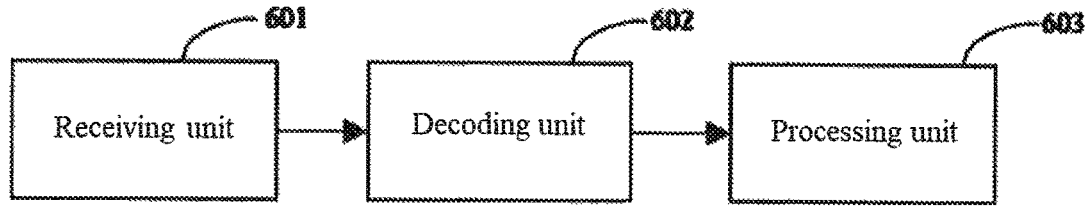
FIG. 6 illustrates a schematic diagram of a decoder of a display terminal according to an embodiment of the invention.

As shown in FIG. 6, FIG. 6 is a schematic diagram of an encoder of a display terminal according to an embodiment of the present invention. The encoder of the display terminal includes a receiving unit 601, configured to receive video data and video processing algorithm information sent by a video encoder. A decoding unit 602, configured to decode the video data and video processing algorithm information, and a processing unit 603, configured to search, according to the video processing algorithm information, a corresponding video processing algorithm, where the video is processed by the corresponding video processing algorithm data. In detail, the video processing algorithm information is a storage address of the video processing algorithm in the display terminal or a number of the video processing algorithm. When the video processing algorithm information is a storage address, the processing unit is configured to locate the video processing algorithm of the storage address, for processing video data by a located video processing algorithm; when the video processing algorithm information is numbered, the processing unit is configured to match a video processing algorithm corresponding to a video processing algorithm number, processing the video data by the matched video processing algorithm.

In another embodiment of the present invention, the receiving unit 601 is further configured to receive the parameter information corresponding to the video processing algorithm, the video data, and the video processing algorithm information; the encoding unit 602 is further configured to decode the video data and the video processing algorithm information, and the parameter information corresponding to the video processing algorithm; the processing unit 603 is further configured to: search for a corresponding video processing algorithm according to the video processing algorithm information, and input parameter information corresponding to the video processing algorithm into the corresponding video processing algorithm, and start the corresponding video processing algorithm o process the video data.

The video server and the display terminal for improving video quality provided by the invention are used together, and the video data and the video processing algorithm information are sent by the video server to the display terminal, and the display terminal calls the corresponding video processing algorithm to process the video data according to the video processing algorithm information and to do targeted processing of video data. By analyzing the characteristics of the video data and determining the video processing parameter information, the video processing can be made more targeted, so that the processed video quality is better and the user experience is improved.

The technical solution of the present invention will be described below with reference to a specific embodiment. In this embodiment, the video server (video encoder) transmits the landscape video to the user display terminal (the decoder of the display terminal), and the landscape video is 2K video data, and the landscape video has requirements for noise reduction, contrast enhancement, and color enhancement. The video processing parameter information is parameter information of noise reduction, contrast enhancement and color enhancement algorithm, and the video processing algorithm information packet includes a noise reduction algorithm, a contrast enhancement algorithm and a color enhancement algorithm to store address information in the display terminal.

Figure 7:
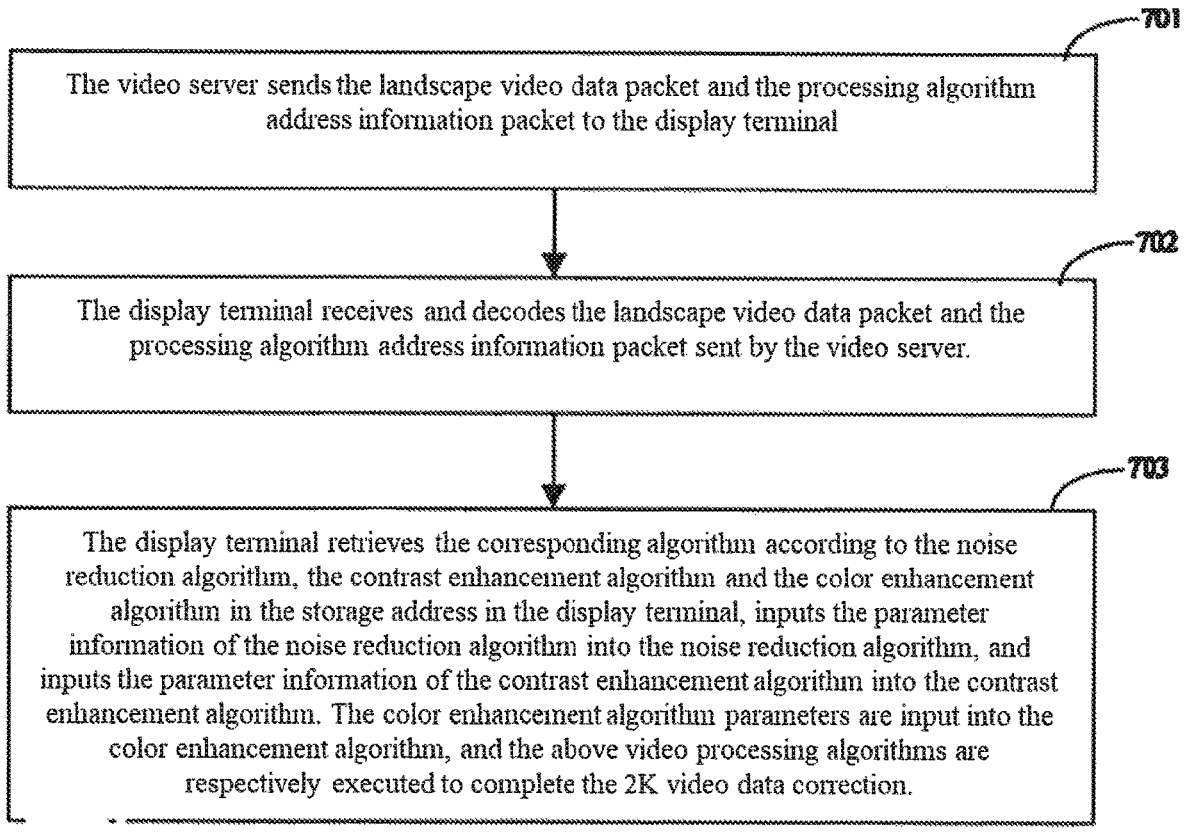
FIG. 7 illustrates a flowchart of a method for improving video quality of a display terminal according to an embodiment of the invention.

As shown in FIG. 7, FIG. 7 is a flowchart of a method for improving video quality of a display terminal according to an embodiment of the present invention, including: Step 701: Video server data packet (including 2K video data and noise reduction, contrast enhancement, and the parameter information of color enhancement algorithm) and the information packet of processing algorithm address (including the noise reduction, contrast enhancement, and the storage address of the color enhancement algorithm in the display terminal) are sent to the display terminal. Step 702: The display terminal receives and decodes the landscape video data packet and the processing algorithm address information packet sent by the video server. Step 703: The display terminal retrieves a corresponding algorithm according to the noise reduction algorithm, the contrast enhancement algorithm, and the color enhancement algorithm in the storage address in the display terminal, inputs the parameter information of the noise reduction algorithm into the noise reduction algorithm, and inputs the parameter information of the contrast enhancement algorithm into the contrast enhancement algorithm, and inputs the color enhancement algorithm parameters into the color enhancement algorithm, and respectively executes the above video processing algorithms (noise reduction algorithm, contrast enhancement algorithm and color enhancement algorithm) to complete 2K video data correction.

The method for improving video quality provided by the present invention sends video data and video processing algorithm information to a decoder of a display terminal, and a decoder of the display terminal invokes a corresponding video processing algorithm to process video data according to video processing algorithm information, and can perform targeted processing to the video data. Regarding the depth image video data for object segmentation of video, it is more accurate to determine object segmentation through later modification. Each segment will use different video processing algorithms and/or process video data, so that the processed video quality is better, improving the user experience.

Figure 8:
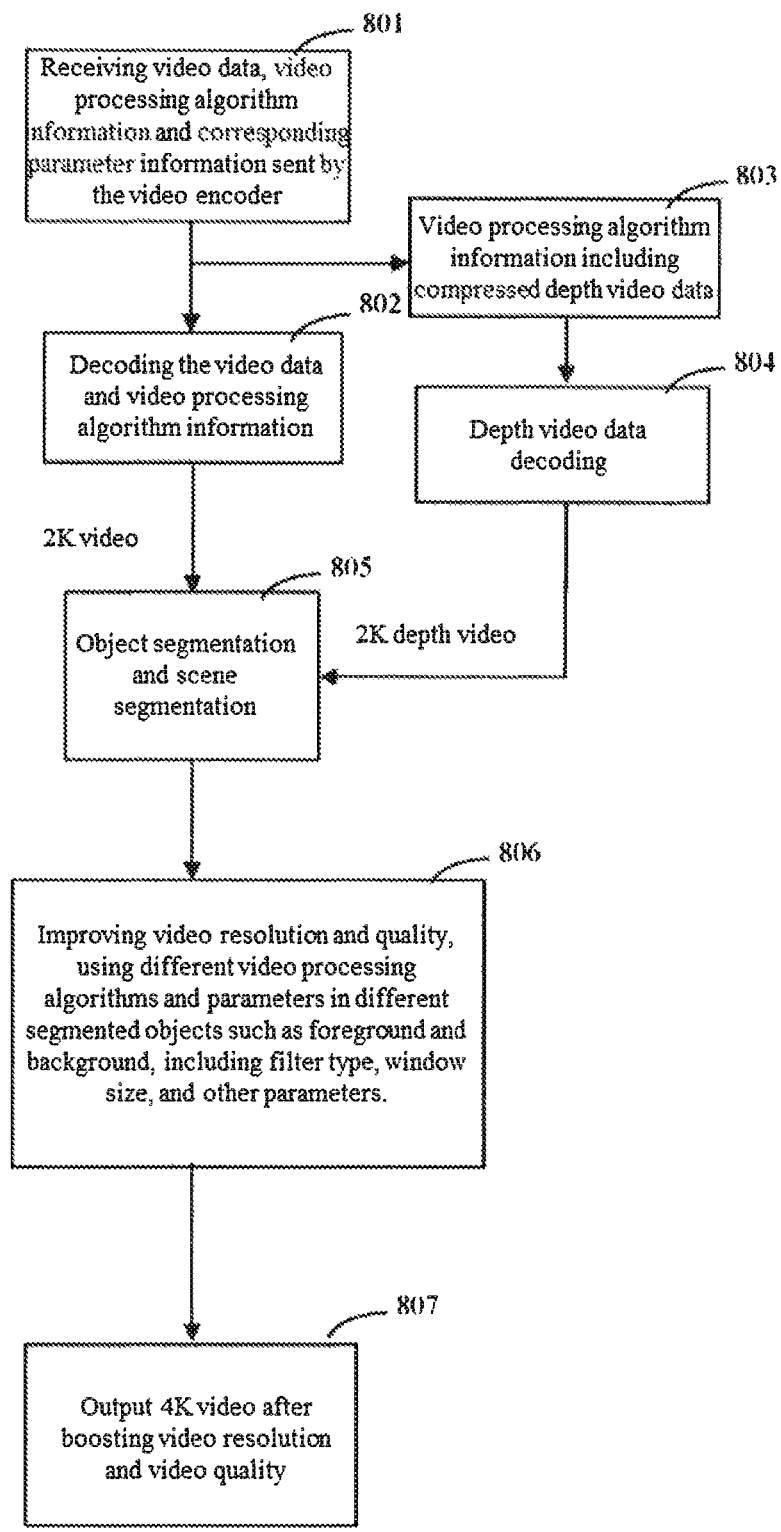
FIG. 8 illustrates a flowchart for improving video quality of display terminal by object segmentation and depth map transmission according to an embodiment of the invention.

As shown in FIG. 8, FIG. 8 is a flowchart of a method for improving video quality of a display terminal according to still another embodiment of the present invention. Displaying the built-in video processing algorithm of the terminal, using the depth map video data to segment the video objects and scenes, and using different video processing algorithms and parameters in different divided objects such as foreground and background, including filter type, window size, and other parameters. The method includes, in step 801, receiving video data sent by a video encoder, video processing algorithm information, and parameter information corresponding to video processing algorithm information, including depth map video data; the video data, video processing algorithm information, and the parameter information corresponding to the video processing algorithm information is in the memory of the video encoder. Step 802: Decoding the video data and video processing algorithm information, having different video processing algorithms and parameters in different divided objects such as foreground and background; step 803: compressing the depth map video data, and decoding the depth map video data in step 804. Step 805: Segmenting the object and the scene of the video according to the decoded depth map video data.

In detail, the video data and depth map video data are acquired in a memory of the video decoder. Assuming that it is the pixel p(x, y) of all coordinates in the video V, and the three segmentation parts S (n=1, 2, 3) of the front and back scene objects obtained by video segmentation, that is, V=Vp(x, y), V=S1∪S2∪S3. Step 806: Improving the video resolution and quality to the desired output q(u,v), using different video processing algorithms F_1( ), F_2( ), F_3( ) and parameters in different segmented objects such as foreground and background. {$\alpha_n$, $\beta_n$, $\gamma_n$, ... } (n=1, 2, 3), including filter type, window size, and other parameters.

$$p_1(x,y) \in S1, q(u,v) = F_1(p_1(x,y), \{\alpha_1, \beta_1, \gamma_1, \ldots\}),$$

$$p_2(x,y) \in S2, q(u,v) = F_2(p_2(x,y), \{\alpha_2, \beta_2, \gamma_2, \ldots\}),$$

$$p_3(x,y) \in S3, q(u,v) = F_3(p_3(x,y), \{\alpha_3, \beta_3, \gamma_3, \ldots\}).$$

The video processing algorithm corresponding to the video processing algorithm number is matched, and the video data is processed by the matched video processing algorithm. Step 807: Completing the correction of each divided part of the 2K video data, adding together to obtain the enhanced video resolution to 4K and video quality, and outputting the video.

Figure 9:
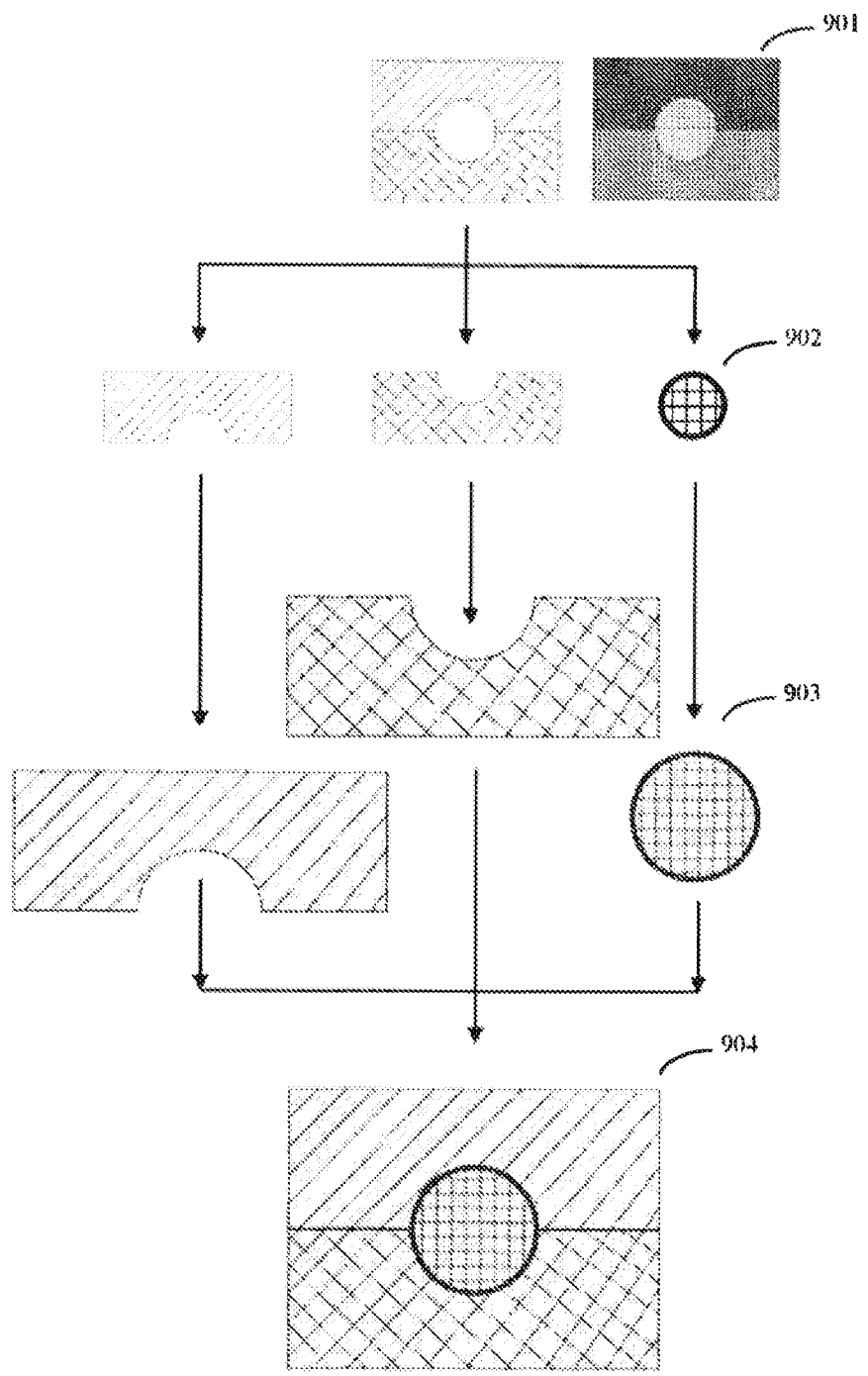
FIG. 9 illustrates an example of dividing video data by depth map using the present invention.

As shown in FIG. 9, FIG. 9 is a flow chart showing the image of the example of FIG. 8. Step 901: Decoding the video data and compressing the depth map video data, and obtaining the video image and the depth map. Step 902: Segmenting the object and/or the scene of the video according to the decoded depth map video data. As shown in the figure, in this embodiment, the video is segmented into three parts: the front, the back, and the object. Step 903: Improving the video resolution and quality to the desired output, using different video processing algorithms and parameters in different partitioned objects such as foreground and background, including filter type, window size, and other parameters. The video processing algorithm corresponding to the video processing algorithm number is matched, and the video data is processed by the matched video processing algorithm. Step 904: Completing the correction of each divided part of the 2K video data, adding together to obtain the enhanced video resolution to 4K and the video quality, and outputting the video.

The various component embodiments of the present invention may be implemented in hardware, or in a software module running on one or more processors, or in a combination thereof. Those skilled in the art will appreciate that a microprocessor or digital signal processor (DSP) can be used in practice to implement methods for improving video resolution and quality and decoders for video encoders and display terminals in accordance with embodiments of the present invention. Some or all of the features of some or all of the components. The invention can also be implemented as a device or device program (e.g., a computer program and a computer program product) for performing some or all of the methods described herein. Such a program implementing the invention may be stored on a computer readable medium or may be in the form of one or more signals. Such signals may be downloaded from an Internet website, provided on a carrier signal, or provided in any other form.

Figure 10:
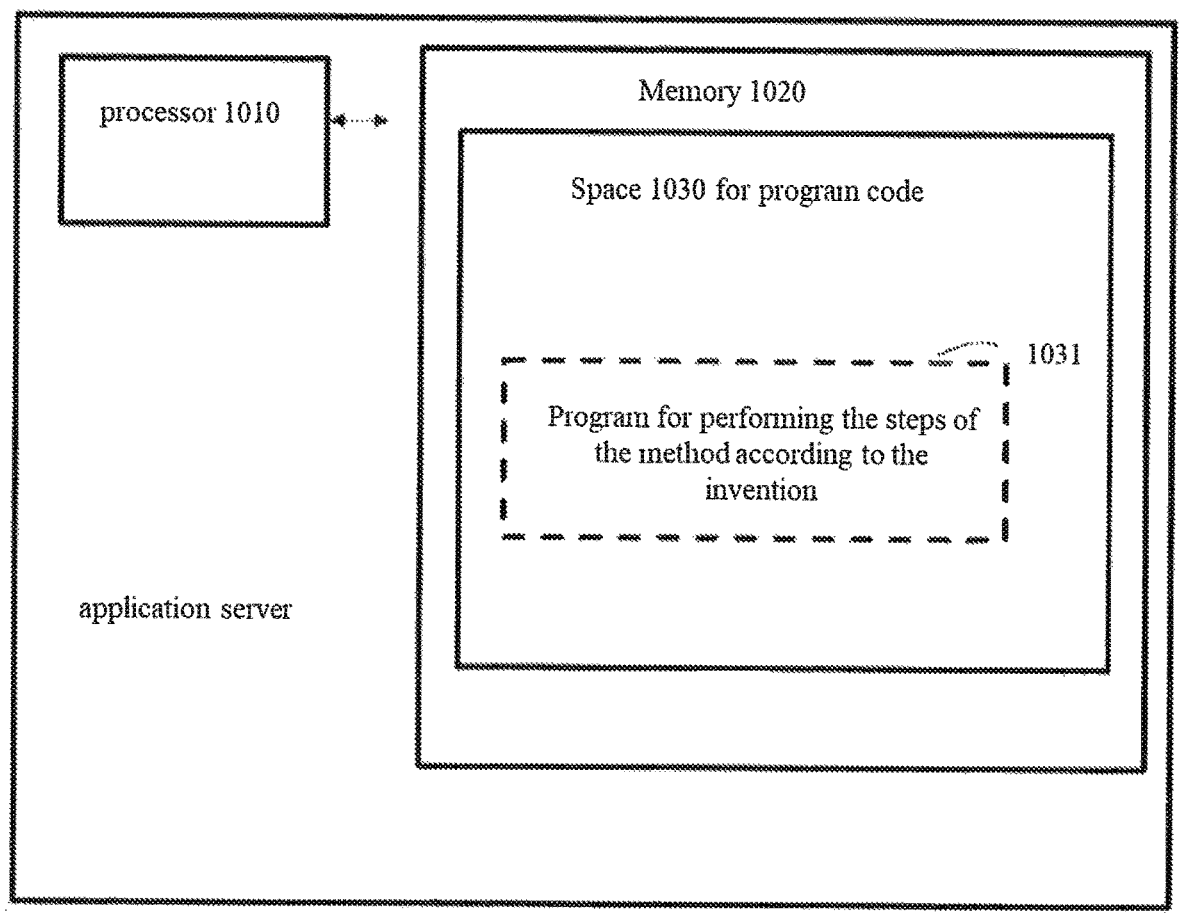
FIG. 10 illustrates a block diagram of a server for performing the method according to the invention is schematically shown.
Figure 11:
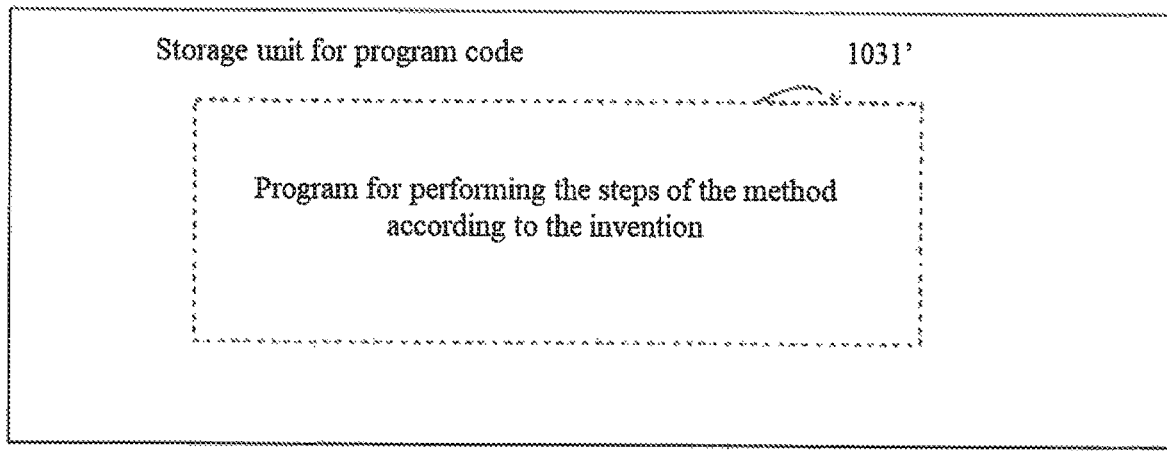
FIG. 11 illustrates a storage unit for holding or carrying program code implementing the method according to the invention is schematically shown.

For example, FIG. 10 illustrates a server, such as an application server, in accordance with the present invention. The server conventionally includes a processor 1010 and a computer program product or computer readable medium in the form of a memory 1020. The memory 1020 may be an electronic memory such as a flash memory, an EEPROM (Electrically Erasable Programmable Read Only Memory), an EPROM, a hard disk, or a ROM. The memory 1020 has a memory space 1030 for executing program code 1031 of any of the above method steps. For example, storage space 1030 for program code may include various program code 1031 for implementing various steps in the above methods, respectively. The program code can be read from or written to one or more computer program products. These computer program products include program code carriers such as hard disks, compact disks (CDs), memory cards or floppy disks. Such a computer program product is typically a portable or fixed storage unit as described with reference to FIG. The storage unit may have a storage section, a storage space, and the like arranged similarly to the storage 1020 in the server of FIG. The program code can be compressed, for example, in an appropriate form. Typically, the storage unit includes computer readable code 1031', i.e., code that can be read by, for example, a processor such as 1010, which when executed by the server causes the server to perform various steps in the methods described above.

"An embodiment" or "embodiment"; or "one or more embodiment"; In addition, it is noted that the phrase "in one embodiment" is not necessarily referring to the same embodiment.

The method for improving video quality, the video encoder and the decoder of the display terminal provided by the invention can perform targeted processing on the video data, thereby improving the quality of the processed video and improving the user experience. The flowcharts, logic modules, and other symbolic operations expressed above are presented in the form of representations that can be executed on a computer system. A program, computer executed step, logic block, process, etc., is contemplated herein as a self-consistent sequence of one or more steps or instructions for obtaining a desired result. These steps are physical operations on physical quantities. These physical quantities include electrical, magnetic or radio signals that are stored, transmitted, combined, compared, and otherwise manipulated in a computer system. These signals can be bits, values, elements, symbols, characters, conditions, numbers, and the like. Each step can be performed by hardware, software, firmware, or a combination thereof.

The above description is only for explaining the technical solutions of the present invention, and those skilled in the art can modify and change the above embodiments without departing from the spirit and scope of the present invention. Therefore, the scope of the invention should be determined by the scope of the claims.

What is claimed is:

1. A method for improving video resolution and quality of a display terminal comprising the steps of:
   sending a video data, a video processing algorithm information, and information packet of processing algorithm address to the display terminal by a video server;
   receiving and decoding the video data, the video processing algorithm information and the information packet of processing algorithm address by the display terminal, which are sent by the video server;
   retrieving a corresponding algorithm according to a storage address of the video processing algorithm information in the display terminal, and inputting the video processing algorithm information into the corresponding processing algorithm;
   obtaining a processed video processing algorithm information and a parameter information corresponding to the video processing algorithm information, and completing the correction of the video data;
   encoding the video data, the video processing algorithm information, and the parameter information corresponding to the video processing algorithm information of the display terminal; and
   sending the encoded video data, the encoded processing algorithm information, and the encoded parameter information corresponding to the video processing algorithm information to a decoder of the display terminal, wherein the parameter information corresponding to the video processing algorithm information is video auxiliary data comprising at least one of the following:
   A video auxiliary data, including a video filter type parameter,
   a filter window size parameter,
   a depth map video data of an object, or
   a scene for dividing a video, for processing video processes, to obtain a video with improved resolution and quality.

2. The method for improving video resolution and quality according to claim 1, further comprising:
   packaging the parameter information corresponding to the video processing algorithm information and the video data into a video data packet;
   packaging the video processing algorithm information into a video processing algorithm information packet;
   transmitting the video data packet and the video processing algorithm information packet to the display terminal in a video stream manner.

3. The method for improving video resolution and quality according to claim 1, wherein the video processing algorithm information is a storage address of a video processing algorithm in the display terminal or a number of a video processing algorithm.

4. The method of improving video resolution and quality as claimed in claim 1, wherein the parameters included in a video assistance data depend on quality and bandwidth requirements at the time of application.

5. A method for improving video resolution and quality of a display terminal comprising the steps of:
   displaying a video processing algorithm of the display terminal, using a depth map video data to segment video objects and scenes, and using different video processing algorithms and parameters in different divided objects such as foreground and background, including filter type, window size, and other parameters, including:

receiving a video data, a video processing algorithm information, and a parameter information corresponding to the video processing algorithm information sent by a video encoder of the display terminal, including the depth map video data; wherein the video data, the video processing algorithm information, and the parameter information corresponding to the video processing algorithm information are in a memory of the video encoder;

decoding the video data, the video processing algorithm information, and the parameter information corresponding to the video processing algorithm information of the display terminal; having different video processing algorithms and parameters in different divided objects such as foreground and background;

compressing the depth map video data;

decocting the depth map video data;

segmenting an object and a scene or a video V according to the decoded depth map video data;

wherein a pixel p(x, y) of all coordinates in the video V, and three segmentation parts S (n=1, 2, 3) of front and back scene objects are obtained by video segmentation, $$V=\forall p(x,y), V=S1 \cup S2 \cup S3;$$

improving the video resolution and quality to the desired output q(u, v) using different video processing algorithms $F_1( )$, $F_2( )$, $F_3( )$ and parameters in different divided objects such as foreground and background; $\{\alpha_n, \beta_n, \gamma_n, \ldots \}$ (n=1,2,3), $$p_1(x,y) \in S1, q(u,v) = F_1(p_1(x,y), \{\alpha_1, \beta_1, \gamma_1, \ldots \}),$$

$$p_2(x,y) \in S2, q(u,v) = F_2(p_2(x,y), \{\alpha_2, \beta_2, \gamma_2, \ldots \}),$$

$$p_3(x,y) \in S3, q(u,v) = F_3(p_3(x,y), \{\alpha_3, \beta_3, \gamma_3, \ldots \}).$$

matching the video processing algorithm corresponding to a video processing algorithm number, and the video data is processed by the matched video processing algorithm;

completing the correction of each divided part of the video data, adding together to obtain the enhanced video resolution 4K and video quality, and outputting the video.

6. The method of improving resolution and quality as claimed in claim 5, further comprising the steps of locating the video processing algorithm of a storage address, and processing the video data by the located video processing algorithm.

7. The method for improving video resolution and quality according to claim 5, wherein the parameter information corresponding to the video processing algorithm information is video auxiliary data, including at least one of the following
a video filter type parameter,
a filter window size parameter,
a depth map video data for objects or
scenes used to segment the video,
for processing video streams.

8. The method of improving video resolution and quality, as claimed in claim 7, wherein after the step of decoding said video processing algorithm information including said depth map video data, the method further comprising the steps of
segmenting said object of said video data and/or the scene, and
setting different video processing algorithms and parameters in different objects and/or scenes after segmentation.

9. The method of improving video resolution and quality according to claim 5, wherein the parameter information included in a video assistance data depend on quality and bandwidth requirements at the time of application.

10. A video encoder of a display terminal comprising
a first sending unit, configured for a video server to send a video data, a video processing algorithm information, and a processing algorithm address information to the display terminal;
a receiving and decoding unit, configured for a display terminal to receive and decode the video data, video processing algorithm information and processing algorithm address information, which are sent by the video server;
a retrieving and inputting unit, configured for the display terminal to retrieve a processing algorithm according to a storage address of the video processing algorithm information in the display terminal, and to input the video processing algorithm information into the processing algorithm;
a correcting unit, configured for the display terminal to obtain the video processing algorithm information and a parameter information corresponding to the video processing algorithm information, and complete the correction of the video data;
an encoding unit, configured to encode the video data, the video processing algorithm information, and the parameter information corresponding to the video processing algorithm; and
a second sending unit, configured to send the encoded video data, the encoded video processing algorithm information, and the encoded parameter information corresponding to the video processing algorithm information to the decoder of the display terminal; wherein the parameter information corresponding to the video processing algorithm is video auxiliary data, including at least one of the following:
a video filter type parameter,
a filter window size parameter,
a depth map video data of an object, or
a scene for dividing a video, for processing video processes, to obtain a video with improved resolution and quality.

11. The video encoder of claim 10, further comprising
a packaging unit, configured to package the parameter information corresponding to the video processing algorithm information and the video data as a video data packet; and package the video processing algorithm information into a video processing algorithm information packet;
and
a transmitting unit, configured to transmit the video data packet and the video processing algorithm information packet to the display terminal in a video stream manner.

12. The video encoder according to claim 10, wherein the parameter information corresponding to the video processing algorithm information is video auxiliary data, including at least one of the following
video filter type parameters,
filter window size parameters,
a depth map video data used to segment the object, or
a scene of the video for processing video streams.

13. The video encoder of claim 12, wherein the parameter information included in a video assistance data depend on quality and bandwidth requirements at the time of application.

14. A decoder for a display terminal for displaying a video processing algorithm of the display terminal, using a depth map video data to segment the video objects and scenes, and using different video processing algorithms and parameters in different divided objects such as foreground and background, including filter type, window size, and other parameters, said decoder comprises:
- a receiving unit; configured to receive a video data, a video processing algorithm information, and a parameter information corresponding to the video processing algorithm information sent by a video encoder; wherein said parameter information includes the depth map video data;
- a storage unit, configured to store the video data, the video processing algorithm information, and the parameter information corresponding to the video processing algorithm information in a memory of the video encoder;
- a decoding unit, configured to decode the video data, the video processing algorithm information, and the parameter information corresponding to the video processing algorithm information; wherein the decoding unit has different video processing algorithms and parameters in different divided objects such as foreground and background;
- a compressing unit, configured to compress the depth map video data;
- a segmenting unit, configured to decode the depth map video data and to segment an object and a scene of a video V according to the decoded depth map video data;
- wherein a pixel p(x, y) of all coordinates in the video V, and three segmentation parts S (n=1, 2, 3) of front and back scene objects obtained by video segmentation, $$V = \forall p(x,y), V = S1 \cup S2 \cup S3;$$

- an improving unit, configured to improve the video resolution and quality to the desired output q(u,y), using different video processing algorithms $F_1()$, $F_2()$, $F_3()$ and parameters in different divided objects such as foreground and background;

$$\{\alpha_n, \beta_n, \gamma_n, \dots\}(n=1,2,3),$$

$$p_1(x,y) \in S1, q(u,v) = F_1(p_1(x,y), \{\alpha_1, \beta_1, \gamma_1, \dots\}),$$

$$p_2(x,y) \in S2, q(u,v) = F_2(p_2(x,y), \{\alpha_2, \beta_2, \gamma_2, \dots\}),$$

$$p_3(x,y) \in S3, q(u,v) = F_3(p_3(x,y), \{\alpha_3, \beta_3, \gamma_3, \dots\}).$$

- a matching unit, configured to match the video processing algorithm corresponding to a video processing algorithm number, and the video data is processed by the matched video processing algorithm; and
- an outputting unit, configured to complete the correction of each divided part of the video data, add together to obtain the enhanced video resolution to 4K and video quality, and outputting the video;
- wherein the processing unit is configured to search for a corresponding video processing algorithm according to the video processing algorithm information, input parameter information corresponding to the video processing algorithm into a corresponding video processing algorithm, and start the corresponding video processing algorithm to process the video data.

15. The decoder for a display terminal according to claim 14 further comprising a positioning unit, configured to locate a video processing algorithm of a storage address, and process the video data by positioning to the video processing algorithm.

16. The decoder for a display terminal according to claim 14, wherein the parameter information corresponding to the video processing algorithm information is video auxiliary data, including at least one of the following
- a video filter type parameter,
- a filter window size parameter,
- a depth map video data for segmenting the object, or
- a scene of the video for processing video streams.

17. The decoder for a display terminal according to claim 14, wherein the parameters included in the video auxiliary data depend on the quality and bandwidth requirements at the time of application.

18. The decoder for a display terminal according to claim 17, further comprising: a dividing unit, after the decoding unit decodes the video processing algorithm information including the depth map video data, the video data objects and/or scenes are segmented, and different video processing algorithms and parameters are set in different objects and/or scenes after segmentation.

* * * * *